G. R. CRANE.
Valves.

No. 145,789.

Patented Dec. 23, 1873.

Witnesses:

Inventor:

Attorneys.

UNITED STATES PATENT OFFICE.

GEORGE R. CRANE, OF PAINESVILLE, OHIO.

IMPROVEMENT IN VALVES.

Specification forming part of Letters Patent No. 145,789, dated December 23, 1873; application filed October 4, 1873.

*To all whom it may concern:*

Be it known that I, GEORGE R. CRANE, of Painesville, in the county of Lake and State of Ohio, have invented a new and Improved Valve, of which the following is a specification:

The invention will first be fully described, and then pointed out in the claim.

Figure 1:
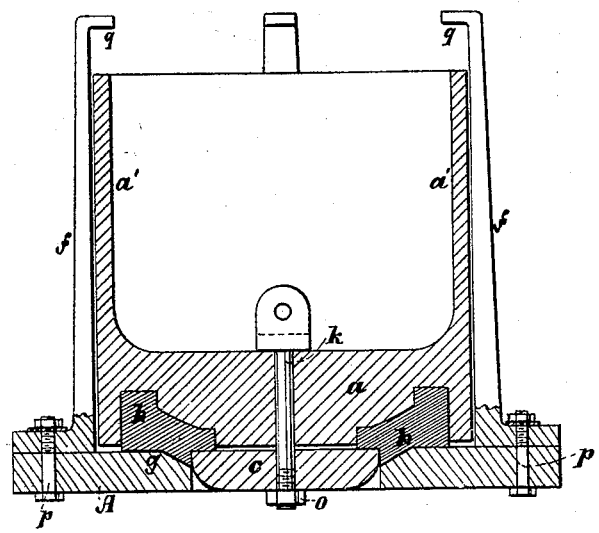
Figure 2:
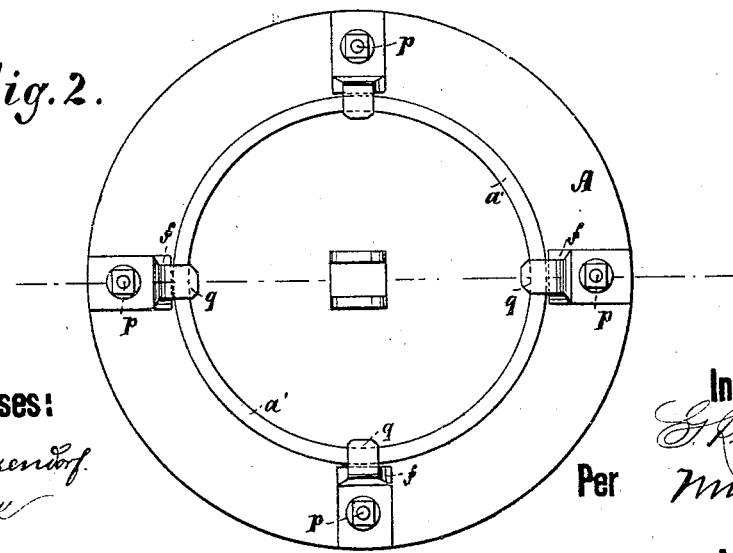

Figure 1 is a sectional elevation of my improved valve, taken on the line $x\ x$ of Fig. 2; and Fig. 2 is a plan view.

Similar letters of reference indicate corresponding parts.

$a$ represents the disk of the valve, and $a'$ the cylindrical extension above it. This extension is preferably made hollow for economizing weight and material. It is arranged in a cage, $f$, composed of three or more standards bolted onto the bottom A of the tank or reservoir by bolts $p$, and having a lug, $q$, at the top, to prevent the valve from being lifted out of its place. The part $a'$ of the valve and standards are extended high enough to prevent the valve from tilting laterally and remaining open at one side in case a small piece of gravel lodges on the seat under it, but so as not to cramp or bind it to interfere with its easy action. $b$ represents a ring of leather, rubber, or other soft material, with which the valve is bushed or seated in the part that rests on the valve-seat $g\ h$. The essential object of this is to utilize soft material for the bearing portion of a large metal valve, in order that the leaks occasioned by closing on gravel and the like will be avoided by the bedding of the gravel in the leather or rubber. Said ring is fitted into an annular recess in the face of the valve, and it is secured by the clamping-disk C, bolt K, and nut O. The upper margin of the disk bears in an annular rabbet in the under side of the bushing, and holds it in place. By using this disk for holding the bushing $b$, I am enabled to utilize the bolt K, to which the lifting-rod is attached for fastening said bushing. I make the valve-seat in the bottom plate A in two parts, of which one, $g$, is in a flat plane, and the other, $h$, is conical or concave, as may be preferred.

With the flexible bushing of the valve constructed to correspond with these forms, all the advantages of both for securing a tight joint are obtained, as the elastic substance will shape itself to both parts, and afford greater security than the same width in one plane will. The valve can be removed most readily for repairing the bushing by unscrewing the fastening of one of the standards, and the bushing can be readily taken out by unscrewing nut O and taking off the disk C.

Having thus described my invention, I claim as new and desire to secure by Letters Patent—

The bars composing the cage, having a stud to keep the valve in place, and being detachably connected to the plate A to allow of removing the valve by removing one of said bars, substantially as specified.

GEORGE R. CRANE.

Witnesses:
 HORACE ALVORD,
 JAMES M. WELLS.